(12) United States Patent
Grani et al.

(10) Patent No.: US 11,277,708 B1
(45) Date of Patent: Mar. 15, 2022

(54) METHOD, APPARATUS AND COMPUTER PROGRAM PRODUCT FOR TEMPORALLY BASED DYNAMIC AUDIO SHIFTING

(71) Applicant: HERE GLOBAL B.V., Eindhoven (NL)

(72) Inventors: Francesco Grani, Berlin (DE); Mario Lopez Batres, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/080,259

(22) Filed: Oct. 26, 2020

(51) Int. Cl.
*H04S 7/00* (2006.01)
*B60Q 5/00* (2006.01)
*G01C 21/36* (2006.01)
*G10L 13/02* (2013.01)

(52) U.S. Cl.
CPC .............. *H04S 7/303* (2013.01); *B60Q 5/005* (2013.01); *G01C 21/3629* (2013.01); *G10L 13/02* (2013.01); *H04S 2400/11* (2013.01); *H04S 2420/01* (2013.01); *H04S 2420/11* (2013.01)

(58) Field of Classification Search
None
See application file for complete search history.

(56) References Cited

U.S. PATENT DOCUMENTS

| 7,970,539 | B2 | 6/2011 | Lee |
| 9,049,534 | B2 | 6/2015 | Eichfeld et al. |
| 9,746,338 | B2 | 8/2017 | Smus et al. |
| 10,440,493 | B2 | 10/2019 | Trestain |
| 2012/0250463 | A1 | 10/2012 | Endo et al. |
| 2018/0283891 | A1* | 10/2018 | Andrew ............ G01C 21/3629 |
| 2019/0170533 | A1 | 6/2019 | Jain |
| 2019/0182613 | A1 | 6/2019 | Mate et al. |

FOREIGN PATENT DOCUMENTS

JP    H 08110237 A    4/1996

OTHER PUBLICATIONS

Heller, F. et al., "NavigaTone: Seamlessly Embedding Navigation Cues in Mobile Music Listening", Hasselt University and University of Bremen, dated Apr. 21, 2018.

* cited by examiner

*Primary Examiner* — Qin Zhu
(74) *Attorney, Agent, or Firm* — Alston & Bird LLP

(57) ABSTRACT

A method, apparatus, and computer program product are therefore provided for providing an spatiotemporal auditory cue to a user. Methods may include: providing for generation of an auditory cue; determining a duration of the auditory cue; and providing for generation of a transition portion of the auditory cue having a dynamic virtual source location moving, relative to a user, from a first virtual source location along a trajectory and ending at a second virtual source location, where the transition portion of the auditory cue has a transition portion duration determined by the duration of the auditory cue and as a function of a predefined transition portion duration threshold.

20 Claims, 11 Drawing Sheets

METHOD, APPARATUS AND COMPUTER PROGRAM PRODUCT FOR TEMPORALLY BASED DYNAMIC AUDIO SHIFTING

TECHNOLOGICAL FIELD

An example embodiment of the present invention relates generally to navigation assistance and user interface techniques, and more particularly, to a method, apparatus and computer program product for providing temporally-based spatial auditory cues to facilitate user interaction with navigational assistance or at least semi-autonomous vehicle control.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route. Further, dynamic map attributes such as route traffic, route conditions, and other dynamic map-related information may be provided to enhance the digital maps and facilitate navigation. Different map service providers along with different user interfaces (e.g., different mobile devices or different vehicle navigation systems) may result in non-uniform map and route guidance interfaces, which may not be intuitive or easily understood by a user, particularly one that is accustomed to a different type of map and navigation interface. Further, visual displays of route guidance instructions may not always be convenient or safe for a user to reference. As such, route guidance is often coupled with audible commands regarding maneuvers such as turns. However, these audible commands may be confusing or difficult to understand, for example, when provided in a complex intersection or when faced with multiple similar maneuver options.

BRIEF SUMMARY

A method, apparatus, and computer program product are therefore provided for providing a user interface for navigation. Embodiments may provide an apparatus including at least one processor and at least one non-transitory memory including computer program code instructions, the computer program code instructions may be configured to, when executed, cause the apparatus to at least: receive an indication of location based information for a user; provide for generation of an auditory cue associated with the location based information; determine a duration of the auditory cue; and provide for generation of a transition portion of the auditory cue having a dynamic virtual source location moving from a first virtual source location along a trajectory and ending at a second virtual source location, where the transition portion of the auditory cue has a transition portion duration determined by the duration of the auditory cue, and where the transition portion duration of the auditory cue does not exceed a predefined transition portion duration threshold.

The apparatus of some embodiments is caused to generate a first portion of the auditory cue in response to the duration of the auditory cue exceeding the predefined transition portion duration threshold, where the first portion of the auditory cue has a virtual source location at the first virtual source location, where the first portion of the auditory cue does not exceed a predefined first portion duration threshold. The apparatus may be caused to generate a third portion of the auditory cue in response to the duration of the auditory cue exceeding a total of the predefined transition portion duration threshold and the predefined first portion duration threshold, where the third portion of the auditory cue has a stationary virtual source location at the second virtual source location. The third portion of the auditory cue may include a duration that is equal to the duration of the auditory cue less the predefined first portion duration threshold and the predefined transition portion duration threshold.

According to some embodiments, causing the apparatus to provide for generation of the transition portion of the auditory cue having a dynamic virtual source location moving from the first virtual source location along the trajectory and ending at the second virtual source location comprises causing the apparatus to provide for generation of the transition portion of the auditory cue having the dynamic virtual source location moving from the first virtual source location along the trajectory and ending at the second virtual source location using three-dimensional spatial audio effects. The second virtual source location may be a location positioned between the user and a location identified in the location based information. The first virtual source location may be proximate a head of the user, where the trajectory is a curved trajectory from the first virtual source location to the second virtual source location. The transition portion of the auditory cue may include a natural language instruction indicating an action to be taken.

Embodiments provided herein may include at least one non-transitory computer-readable storage medium having computer-executable program code instructions stored therein, the computer-executable program code instructions including program code instructions to: receive an indication of location based user information for a user; provide for generation of an auditory cue associated with the location based information; determine a duration of the auditory cue; in response to the duration of the auditory cue being less than a predefined transition portion duration threshold: generate a transition portion including the auditory cue having a dynamic virtual source location moving from a first virtual source location along a trajectory and ending at a second virtual source location; in response to the duration of the auditory cue being greater than a predefined transition portion duration threshold: generate a first portion of the auditory cue having a stationary virtual source location at the first virtual source location; and generate a transition portion of the auditory cue having a duration equal to the predefined transition portion duration and having a dynamic virtual source location moving from a virtual source location along a trajectory and ending at a second virtual source location.

Embodiments of the computer program product may include program code instructions to: in response to the duration of the auditory cue being greater than a total of the predefined transition portion duration threshold and a first portion duration threshold: generate a third portion of the auditory cue having a stationary virtual source location at the second virtual source location, where the first portion of the auditory cue precedes the transition portion, and where the third portion of the auditory cue follows the transition portion. Generation of the first portion of the auditory cue at the first virtual source location and generation of the transition portion of the auditory cue having the dynamic virtual source location moving from the first virtual source location along the trajectory and ending at the second virtual source location are performed using three-dimensional spatial audio effects.

The second virtual source location may be a location positioned between the user and a location identified in the location based information. The transition portion of the auditory cue may include an instruction including an action to be taken, where the first portion of the auditory cue includes an indication of a distance to reach a location where the action is to be taken. The auditory cue may include a natural language sentence conveying the location based information to the user. The first virtual source location may be proximate a head of the user, where the trajectory is a curved trajectory from the first virtual source location to the second virtual source location.

Embodiments provided herein may include a method including: providing for generation of an auditory cue; determining a duration of the auditory cue; and providing for generation of a transition portion of the auditory cue having a dynamic virtual source location moving, relative to a user, from a first virtual source location along a trajectory and ending at a second virtual source location, where the transition portion of the auditory cue has a transition portion duration determined by the duration of the auditory cue and as a function of a predefined transition portion duration threshold. Methods may include generating a first portion of the auditory cue in response to the duration of the auditory cue exceeding the predefined transition portion duration threshold, where the first portion of the auditory cue has a stationary virtual source location at the first virtual source location, where the first portion of the auditory cue does not exceed a predefined first portion duration or has a duration substantially equal to the auditory cue duration less the predefined transition portion duration threshold.

According to some embodiments, methods may include generating a third portion of the auditory cue in response to the duration of the auditory cue exceeding a total of the predefined transition portion duration threshold and the predefined first portion duration threshold, where the third portion of the auditory cue has a stationary virtual source location at the second virtual source location. The third portion of the auditory cue has a duration that is equal to the duration of the auditory cue less the predefined first portion duration threshold and the predefined transition portion duration threshold. The auditory cue may include location based information for the user, where the first virtual source location is proximate a head of the user, where the trajectory is a curved trajectory from the first virtual source location to the second virtual source location, and where the second virtual source location is a location positioned between the user and a location identified in the location based information.

Embodiments provided herein may include an apparatus including: means for providing for generation of an auditory cue; means for determining a duration of the auditory cue; and means for providing for generation of a transition portion of the auditory cue having a dynamic virtual source location moving, relative to a user, from a first virtual source location along a trajectory and ending at a second virtual source location, where the transition portion of the auditory cue has a transition portion duration determined by the duration of the auditory cue and as a function of a predefined transition portion duration threshold. An example apparatus may include means for generating a first portion of the auditory cue in response to the duration of the auditory cue exceeding the predefined transition portion duration threshold, where the first portion of the auditory cue has a stationary virtual source location at the first virtual source location, where the first portion of the auditory cue does not exceed a predefined first portion duration or has a duration substantially equal to the auditory cue duration less the predefined transition portion duration threshold.

According to some embodiments, example apparatuses may include means for generating a third portion of the auditory cue in response to the duration of the auditory cue exceeding a total of the predefined transition portion duration threshold and the predefined first portion duration threshold, where the third portion of the auditory cue has a stationary virtual source location at the second virtual source location. The third portion of the auditory cue has a duration that is equal to the duration of the auditory cue less the predefined first portion duration threshold and the predefined transition portion duration threshold. The auditory cue may include location based information for the user, where the first virtual source location is proximate a head of the user, where the trajectory is a curved trajectory from the first virtual source location to the second virtual source location, and where the second virtual source location is a location positioned between the user and a location identified in the location based information.

BRIEF DESCRIPTION OF THE DRAWINGS

Figure 1:
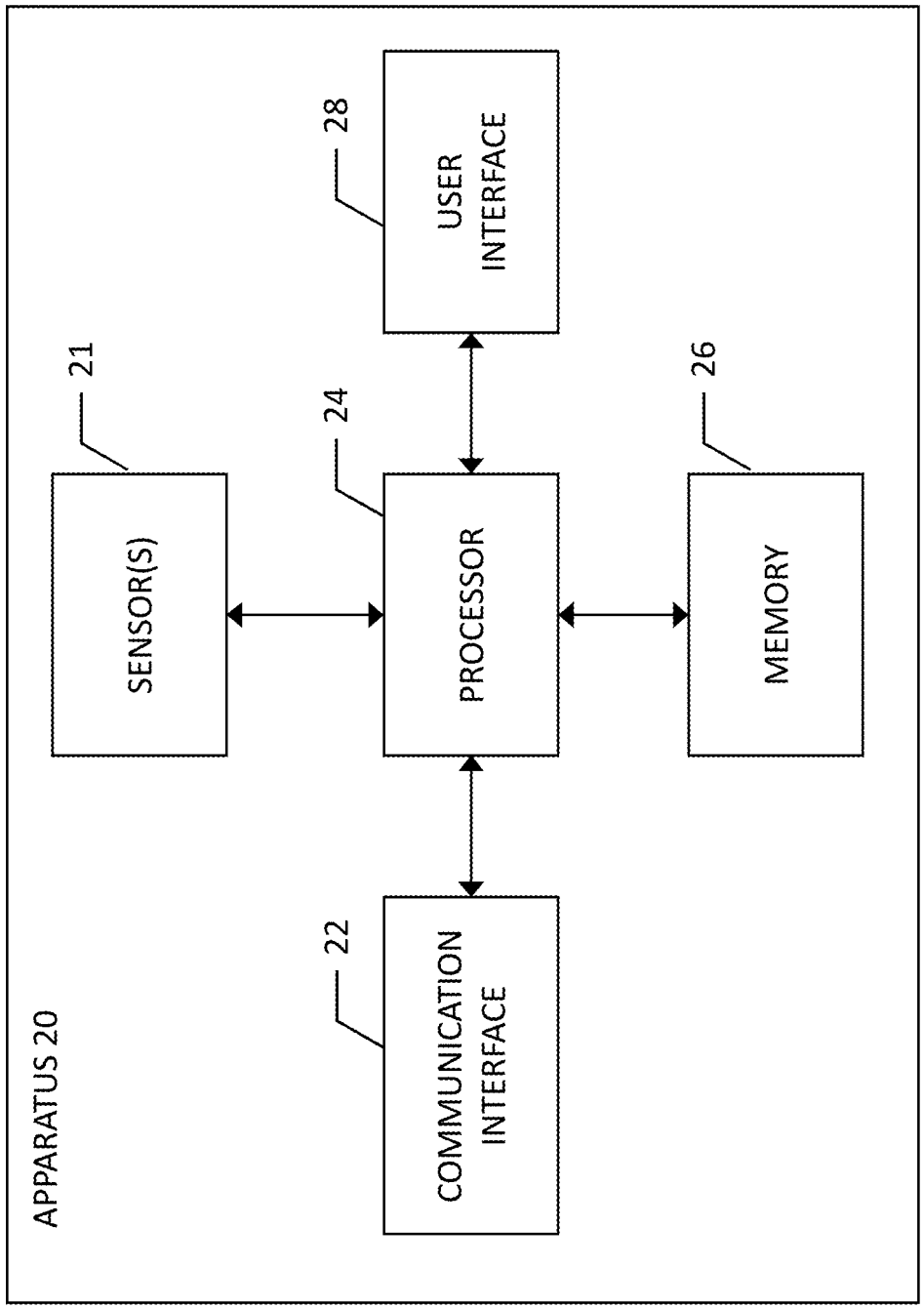
Figure 2:
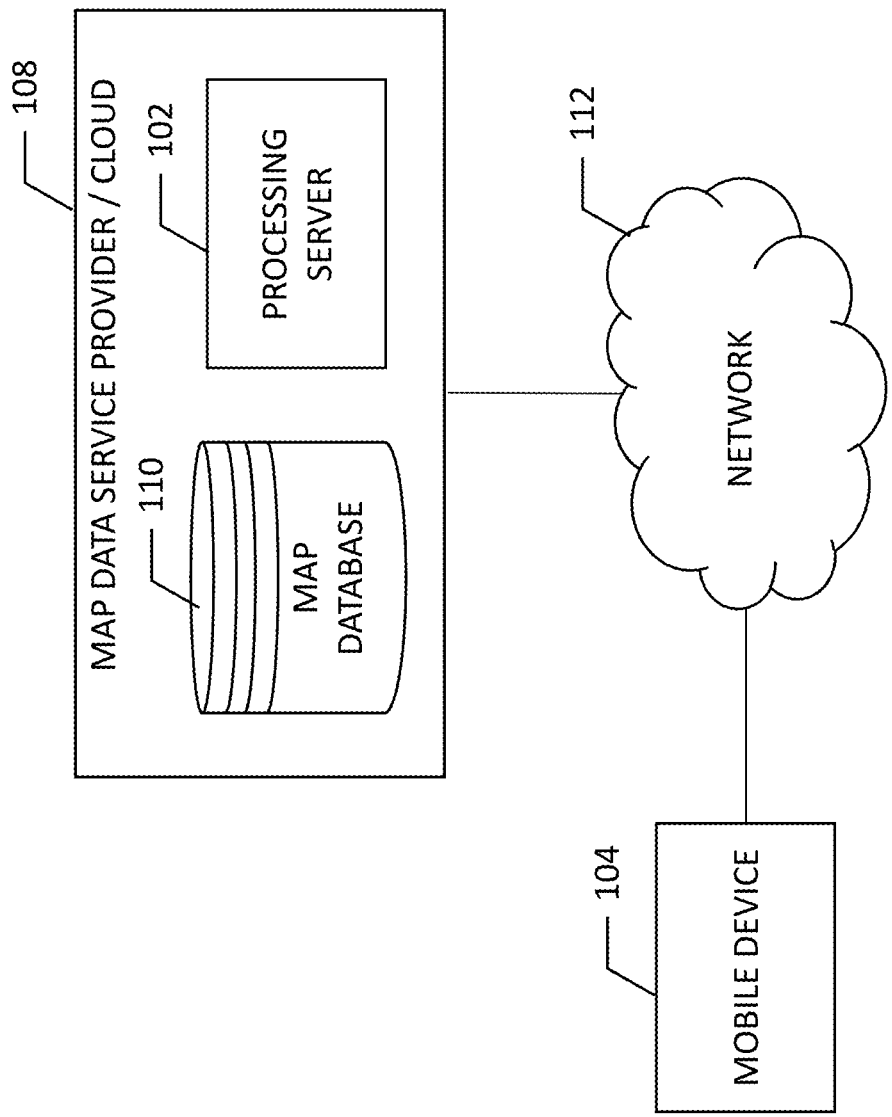
Figure 3:
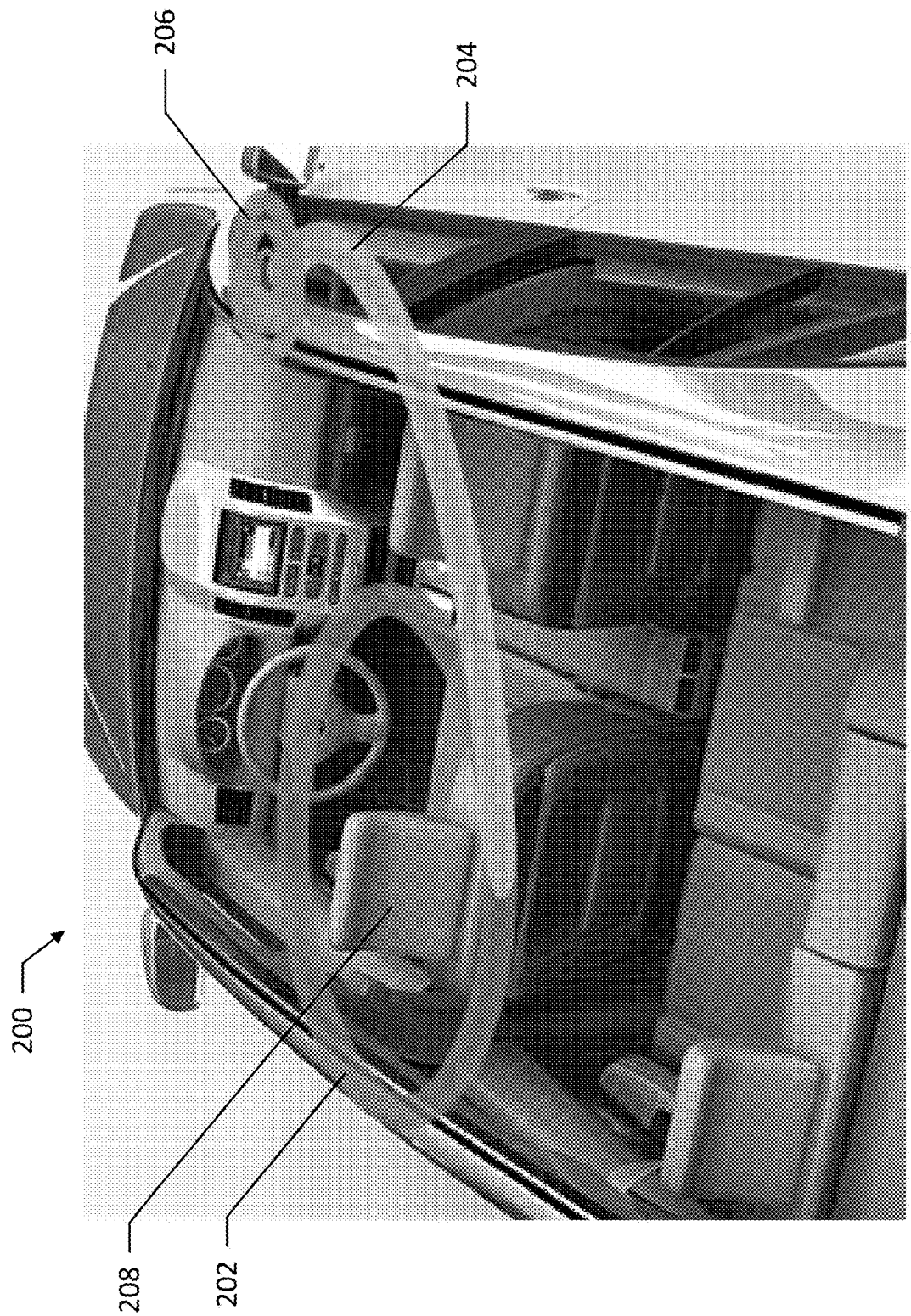
Figure 4:
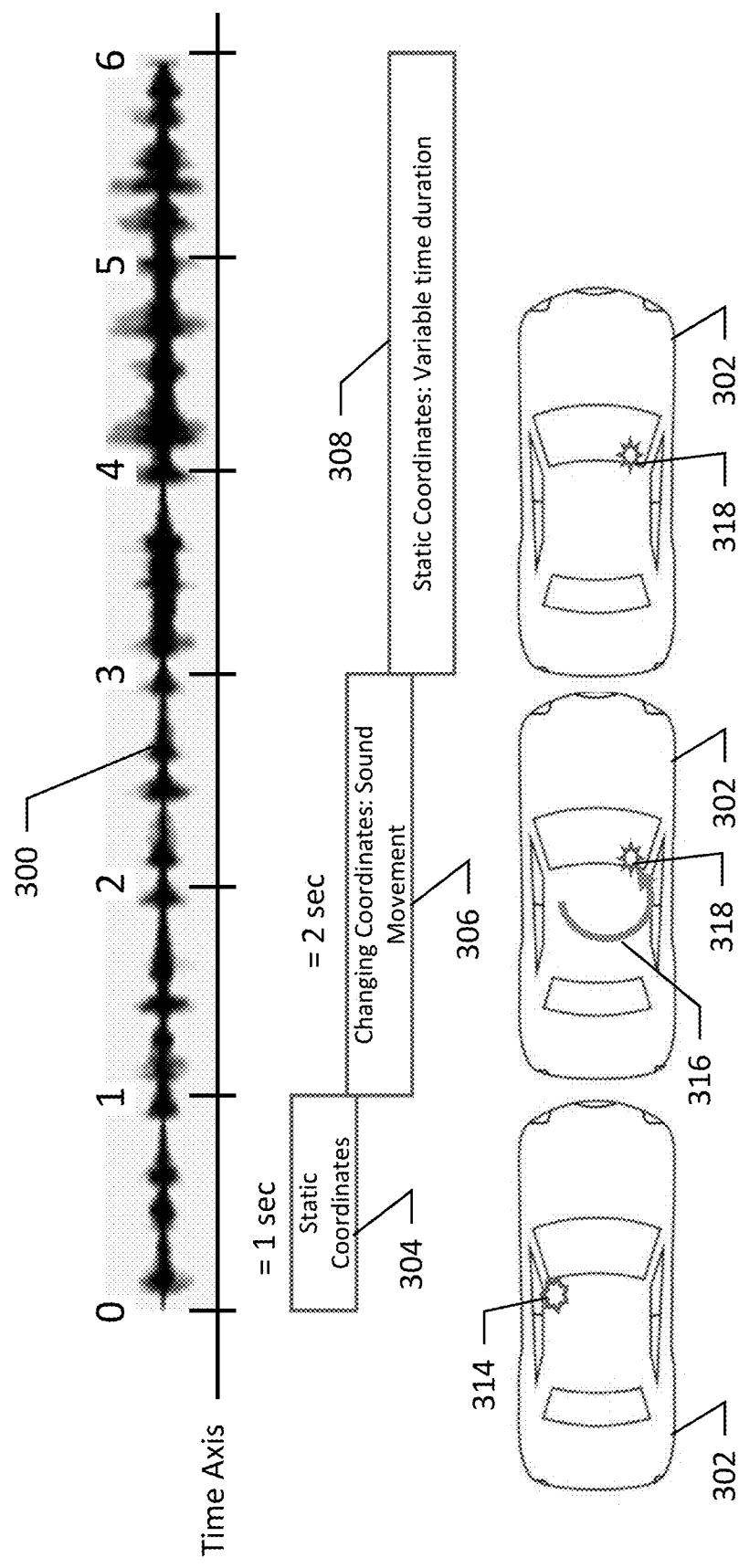
Figure 5:
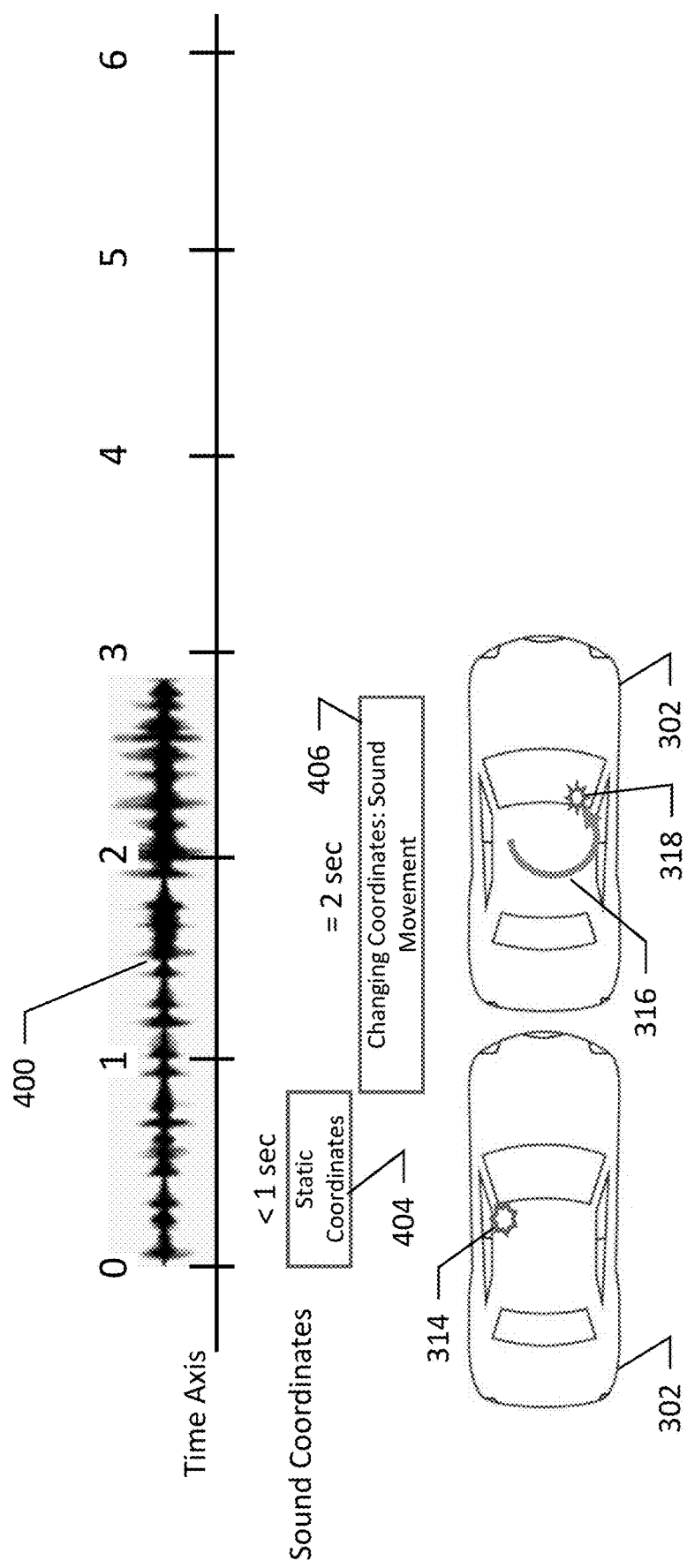
Figure 6:
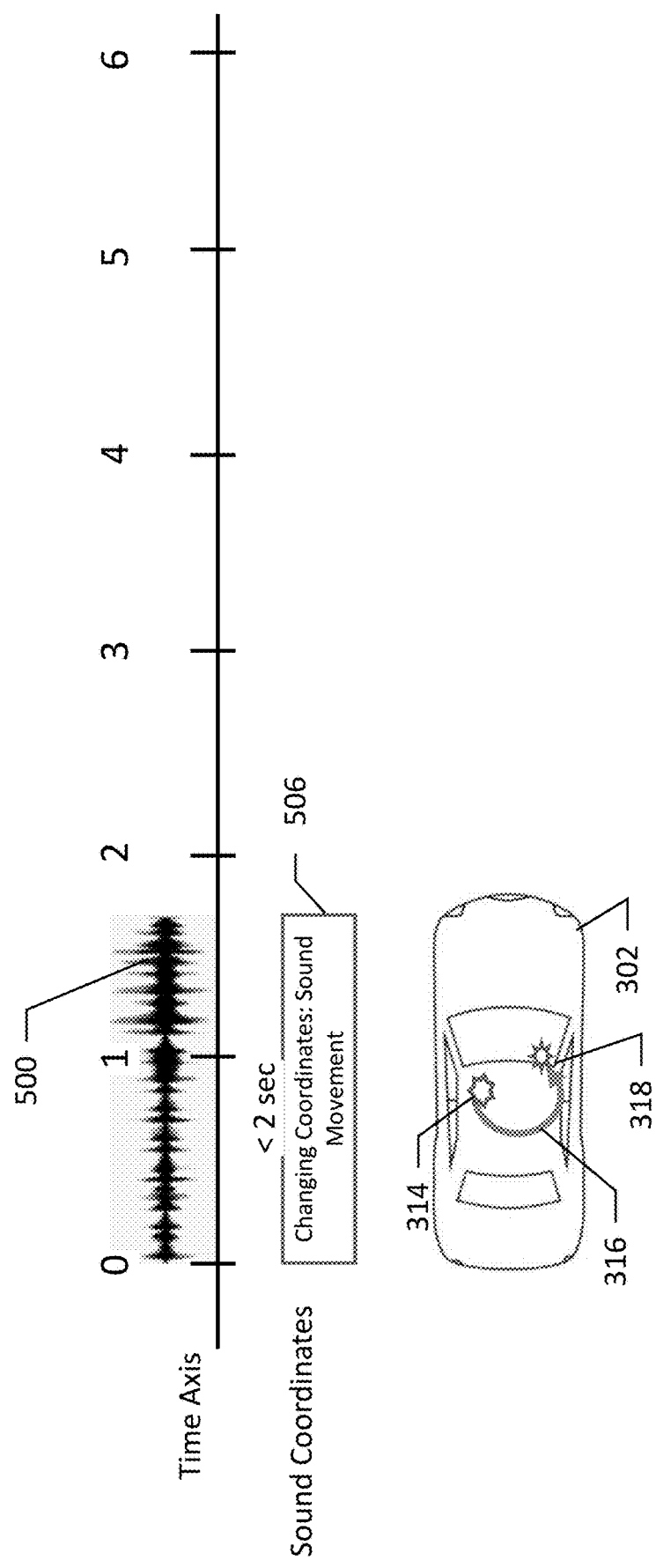
Figure 7:
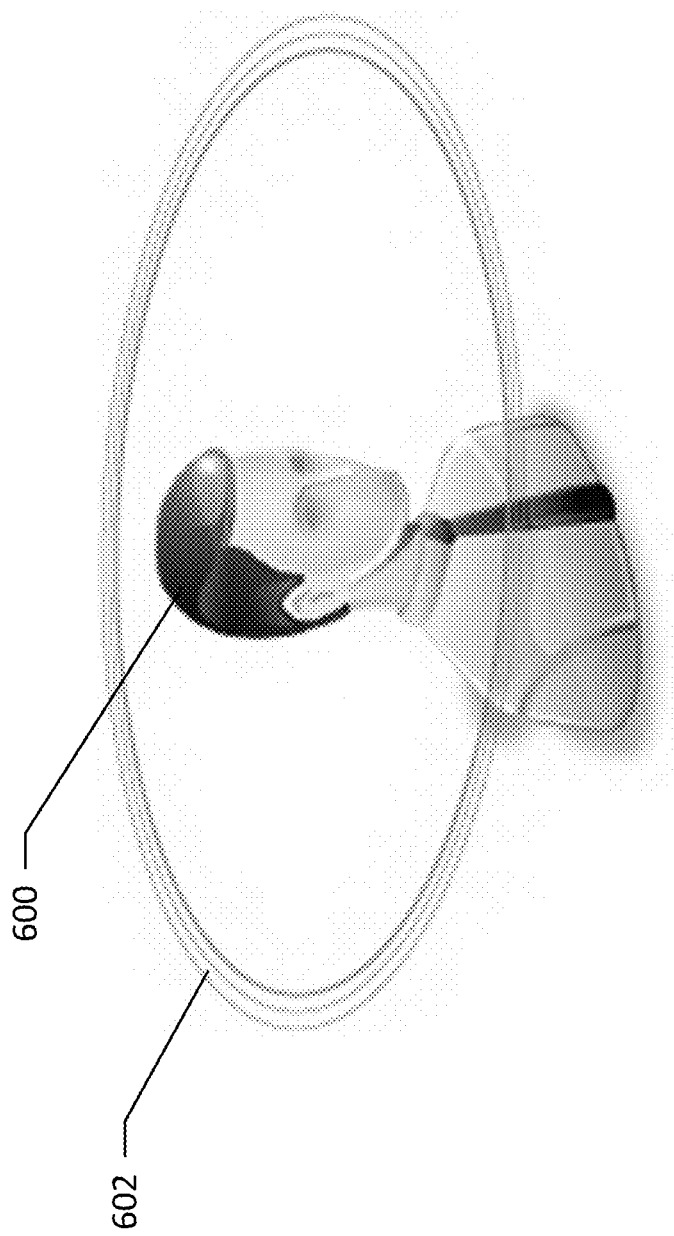
Figure 8:
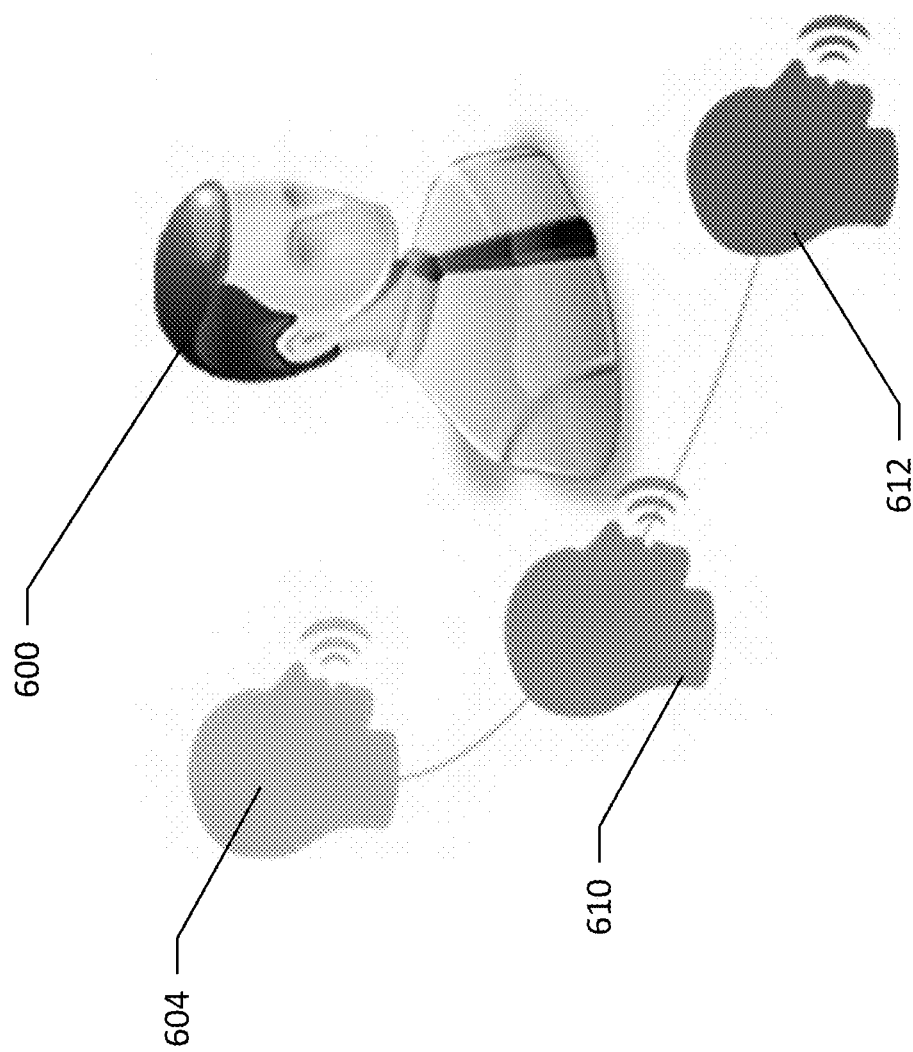
Figure 9:
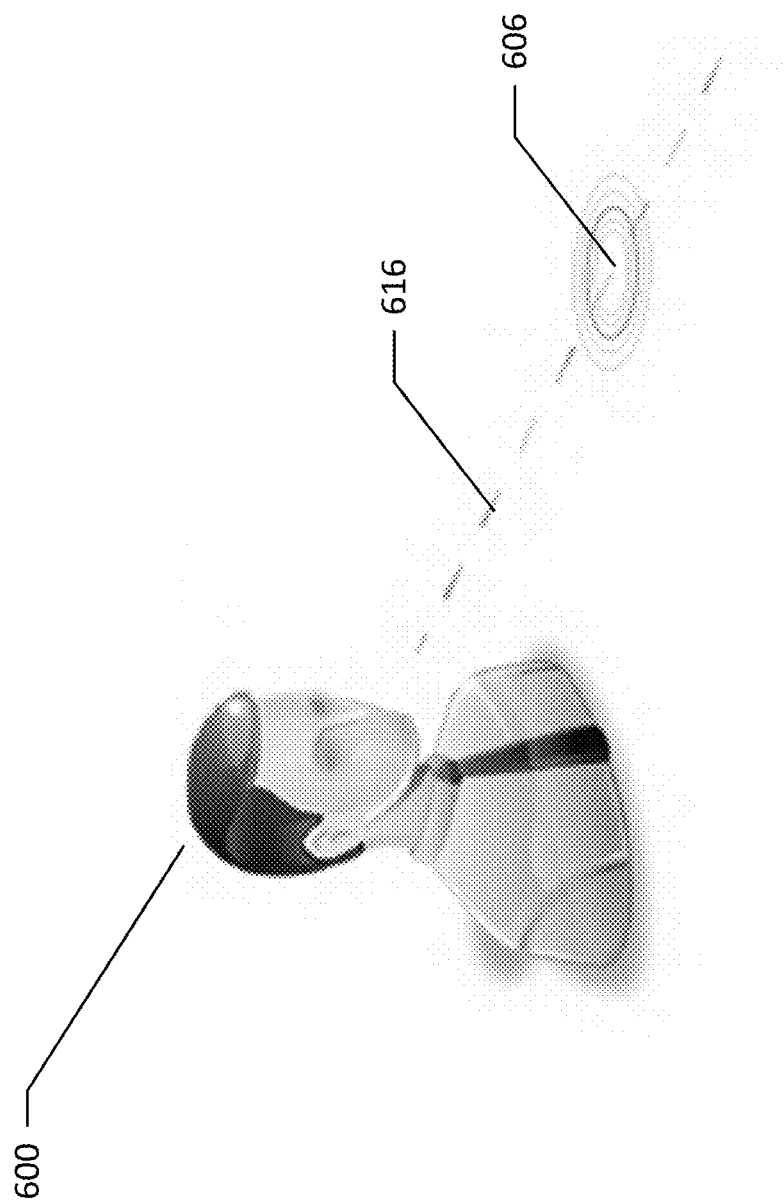
Figure 10:
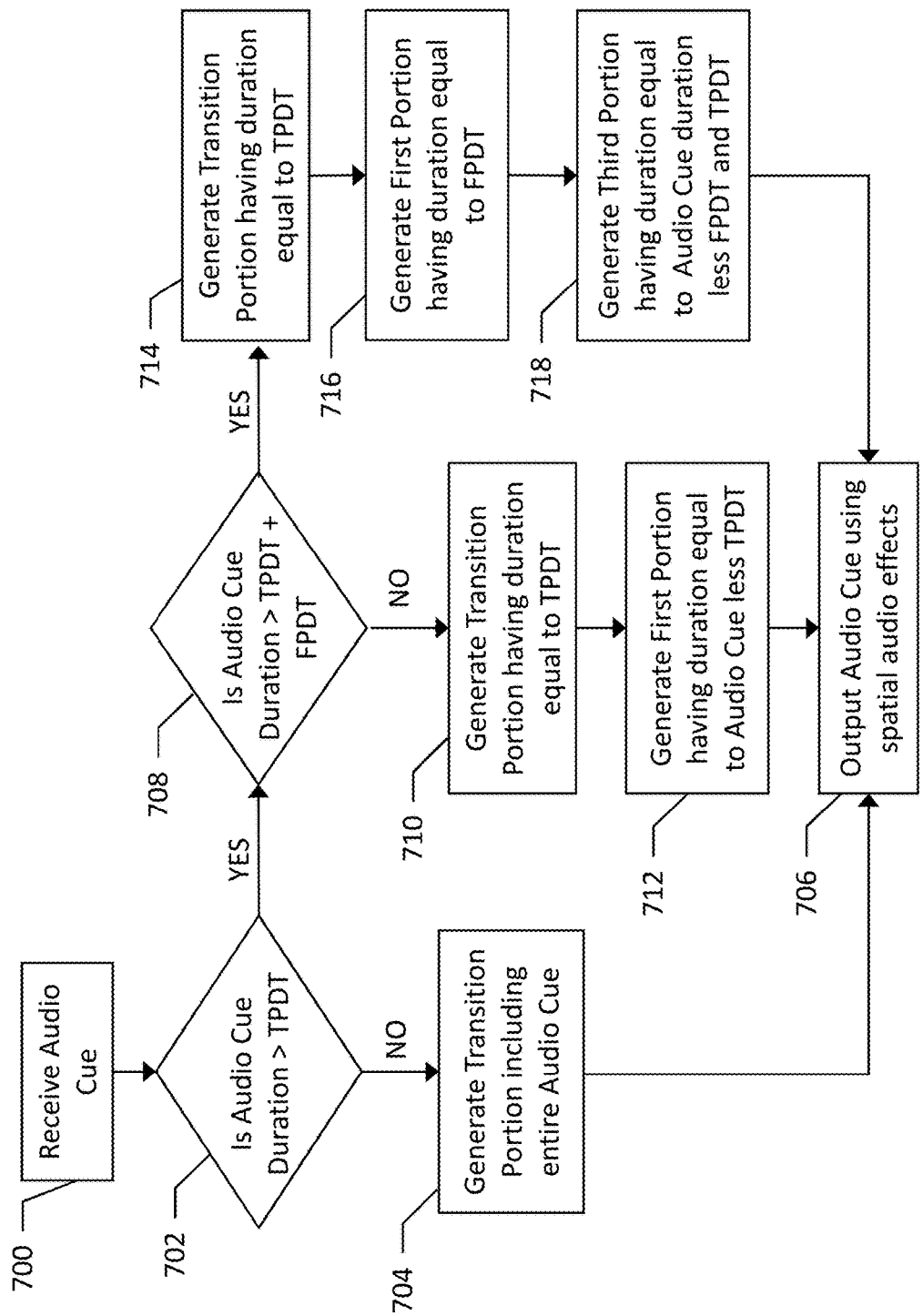
Figure 11:
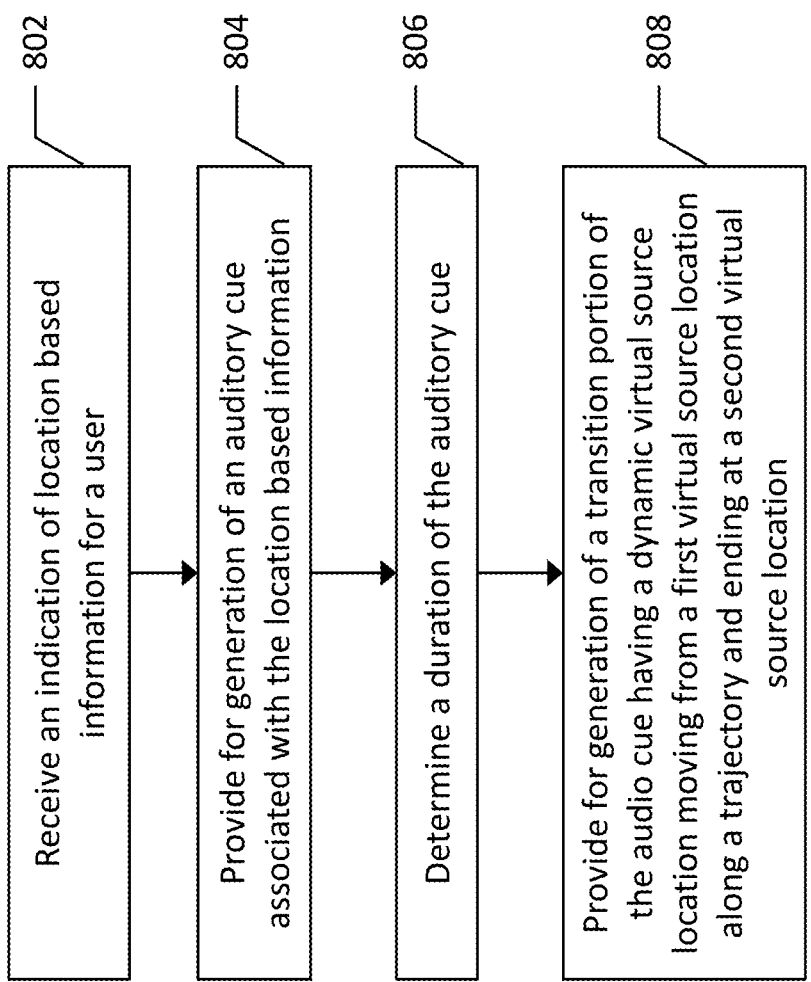

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system of implementing route guidance on a navigation system according to an example embodiment of the present disclosure;

FIG. 3 depicts an example environment and graphical representation of auditory cues according to an example embodiment of the present disclosure;

FIG. 4 illustrates timeline and spatial representation of an auditory cue provided to a user according to an example embodiment of the present disclosure;

FIG. 5 illustrates another timeline and spatial representation of an auditory cue provided to a user according to an example embodiment of the present disclosure;

FIG. 6 illustrates still another timeline and spatial representation of an auditory cue provided to a user according to an example embodiment of the present disclosure;

FIG. 7 illustrates an auditory cue having a virtual source position proximate a head of a user according to an example embodiment of the present disclosure;

FIG. 8 illustrates a transition portion of an auditory cue having a dynamic virtual source position that moves along a trajectory relative to a user according to an example embodiment of the present disclosure;

FIG. 9 illustrates an auditory cue having a virtual source position in a direction of a point of interest or location according to an example embodiment of the present disclosure;

FIG. 10 is a flowchart of a method for providing temporally-based spatial auditory cues to facilitate user interaction with navigational assistance or at least semi-autonomous vehicle control according to an example embodiment of the present disclosure; and FIG. 11 is a flowchart of another method for providing temporally-based spatial auditory cues to facilitate user interaction with navigational assistance or at least semi-autonomous vehicle control according to an example embodiment of the present disclosure;

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present disclosure for providing an effective delivery of information through spatial audio in a navigational context. A combined approach of auditory stimuli is described herein to form a spatial sound language. The spatial auditory cues described herein may provide a useful and easily interpreted instruction to a user in a manner that promotes user understanding of the auditory cues and precise location indications provided through auditory cues and instructions. The auditory cues of example embodiments may include voice prompts that provide instructions to a driver or operator of a vehicle with regard to navigational assistance or provide informative prompts regarding an environment of the driver or operator. These auditory cues may include one or more components of the cue, such as an instruction (e.g., turn right, proceed straight, etc.) and an identifier (e.g., a road name). Further, the auditory cues may include identification of reference points or distances, such as a voice prompt indicating "after 300 yards" or "after the intersection", for example. As described herein, embodiments may provide for a user interface with a navigation system or vehicle infotainment system. The user interface described herein provides an intuitive and easily understood auditory cues that convey information and relevant location to a user in a manner that helps the user understand the directional nature of the auditory cue.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system or infotainment system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, a plurality of spatially arranged speakers, headphones, ear bud speakers, physical buttons, and/or other input/output mechanisms. The user interface 28 may be incorporated into a vehicle, such as a dedicated navigation system display/audio system or a device that can attach or associate with the vehicle physically and/or via a wireless communication link. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 26, and/or the like). In this regard, the apparatus 20 may provide spatial auditory cues via speakers, headphones, earbuds, or the like, to a user to convey information and a relevant location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE) and/or the fifth generation technology standard for broadband cellular networks, 5G. In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory device 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, lidar, ultrasonic and/or infrared sensors.

In example embodiments, a navigation system user interface may be provided to provide route guidance from an origin to a destination. Navigation systems may receive an indication of an origin, which may include a current location of a device on which the navigation system is operating (e.g., an in-vehicle navigation system or a mobile device, for example), and an indication of a destination where the user of the navigation system is going. In response to receiving the origin and destination pair, a route may be generated between the origin and destination. The route may be generated according to user preferences for fastest travel time, minimizing highways (e.g., limited access high-speed roadways), maximizing highways, shortest distance, etc. Further, waypoints may be provided between the origin and destination, or a route may include multiple, sequential destinations. Example embodiments provided herein may be used for a navigation system user interface to provide route guidance to the first destination, the last destination, or the ultimate destination with waypoints indicated in the route guidance from the origin and possibly points of interest along the route.

A map service provider database may be used to provide route guidance to a navigation system. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, the vehicle itself, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. The map data can be organized in different map layers. According to some example embodiments, the road segment data records may be links or segments representing roads, streets, or paths, as may be used in calculating a route or recorded route information for determination of one or more personalized routes. The node data may be end points (such as representing intersections) corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an in-vehicle navigation system, such as an ADAS (advanced driver assistance system), a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

Route guidance from an origin to a destination may be communicated to a user through visual and/or auditory cues including audible instructions. Auditory cues are typically synthesized voice instructions that deliver spoken instructions to a driver regarding a next upcoming maneuver required to stay on a route to a destination. Navigation systems and routing engines may determine decision points within the road network corresponding to maneuvers, and these decision points may be provided to a text-to-speech engine for converting the maneuvers into spoken instructions. Spoken instructions may be the communication channel of choice, as opposed to written instructions on a display or visual instructions on a display, to improve safety, as the driver may be using their vision for the task of driving.

In the field of sound reproduction, improvements have been developed over years to enhance the auditory experience. Monoaural sound may be sufficient to convey a message; however, developments such as stereo sound and spatial audio methods (e.g., surround, binaural audio, Ambisonics, vector base amplitude panning (VBAP), virtual sound source positioning, etc.) have expanded the possibilities of using sound to simulate an entire three-dimensional environment and to convey rich auditory information such as the characteristic of emission of a sound source (e.g., is it a widespread source or a directional source), the sound source position, and distance from a listener. Further, the movement of a sound source in space may be conveyed using spatial audio methods. The characteristics of an acoustic space within which the sound is produced may be tuned to convey characteristics of a sound source with a high level of accuracy. These methods exploit the full capabilities of the human ear to perceive and discriminate more information about a sound event than simply its content.

As autonomous vehicle control begins to take shape, new interaction paradigms between users can be exploited. Vehicle autonomy can include partial autonomy with driver assistance features such as lane-keep assist, adaptive cruise control, and brake assist features, for example, but can also include full autonomy where a driver becomes a passenger in the vehicle while the vehicle controls all functions of driving. In some instances, vehicle autonomy may transition during different phases of a driving event, such as where a driver begins to drive along a route, but then "handover" vehicle control to an autonomous system. Handover events and experiences may require a complete engagement of the user, such as to receive cues as to when to take over or relinquish control of the vehicle which requires the full attention of the driver. A "spatially informed driver" may be informed of where the next action needs to take place in the handover experience. In full autonomous mode, where all vehicle users are passengers, interaction with the vehicle may be reduced to general instructions regarding destinations and the vehicle assumes an informative and/or entertaining role in the interaction. Further, in a higher degree of automation, vehicles may no longer resemble vehicles as conventionally used today, and may adapt into transport units that can include alienation from the surroundings outside the transport unit. Spatial awareness through sound augmentation of reality can offer a discrete solution to contrast alienation.

Conventional voice navigation instructions are delivered as a message only without any spatial considerations. This approach may be sufficient in straightforward navigational situations, such as a rural road intersection without any unconventional road features proximate the intersection, but as the complexity of roads and related maneuvers increases, such as around dense urban environments, additional information may be desirable. Visual displays of route guidance information and point of interest information may be more detailed and may provide a user a greater understanding of their surroundings; however, this may distract a driver from a maneuver if they are moving, particularly in a densely populated area. The delivered voice instructions alone may not be sufficient for a driver to interpret a maneuver in a spatial context.

Provided herein is a method to solve the problem related to context awareness and how to provide spatially relevant auditory information, in the form of spoken or other auditory stimuli that aids the driver of a vehicle in performing the next action whether it is a maneuver or a handover event. While a vehicle is in an autonomous mode, for achieving a truly immersive experience, information about a vehicle's surroundings may be conveyed not only as content, but as spatially localized information relevant to a specific point outside of the vehicle. Further, while embodiments are described herein with regard to navigational assistance and providing navigational instructions to a driver, embodiments may be employed to provide information to a user regarding points of interest or other information that is associated with a location that can be communicated to a user through spatial auditory cues.

Embodiments described herein provide an effective delivery of information through spatial audio in the navigation context and in the informational context. The auditory cue may come in the form of spoken instructions such as a natural language sentence, delivering a more complex payload of information that cannot be unambiguously conveyed with a simple sound. The delivery of these spoken instructions may be done such that, spatially, the voice starts at the driver's head and continues to move toward the decision point (e.g., a maneuver/turn) or other location associated with the information that is being conveyed. The sound can be located in the horizontal plane of a three-dimensional space following a trajectory with high precision.

Different approaches are available for delivering spatial sound in a vehicle. Particularly the auditory cue described herein may be delivered using either a binaural approach with speakers adjacent to the driver's ears or Higher Order Ambisonics using an arrangement of multichannel speakers in a vehicle. Optionally, binaural and high order ambisonics can be used at the same time to create an improved perception of distance when a sound is retreating. Further, more conventional audio reproduction techniques may be used such as Surround Sound (e.g., 5.1 channel audio, 7.1 channel audio, etc.) or even simple stereo acoustic reproduction that can replicate movement in an audio cue.

In order to provide useful navigation assistance or point of interest information through spatial auditory cues of example embodiments, a location of the user and vehicle must be determined. This may be performed through a combination of GNSS (Global Navigation Satellite System) sensors and other vehicle sensors, such as inertial measurement units (IMUs) or the like, as represented by sensors 21 of apparatus 20 in FIG. 1. Other positioning means may optionally be used, such as location referencing using roadside objects, cellular signal or near-field communication signal fingerprinting or triangulation, etc. A coordinate pair, with varying degrees of accuracy dependent on the positioning methods may be used to determine the location of the vehicle. The determined location may be associated with a location on a digital map maintained, for example, by map data service provider 108 of FIG. 2.

A user of the vehicle, such a driver or an occupant, may provide a desired destination using physical controls or voice activation. Optionally, a destination may be predicted using collected mobility patterns. Once a destination has been established, a route to the destination may be generated. Such a route may include decision points where a driver may be required to perform a maneuver. Optionally, the route may include points of interest or waypoint that may be established based on user preferences, mobility patterns, crowd-sourced information such as interest/popularity, or the like. The decision points, points of interest, and waypoints may each correspond to a specific coordinate pair in the map that is along or proximate the route to the destination.

Using a current location of a vehicle, the location of a decision point, and the required maneuver, a spatial auditory cue may be generated. A speed of the vehicle may optionally be considered to provide a spatial auditory cue sufficiently ahead of a required maneuver. The spatial auditory cue may provide a natural language instruction or information to a driver or occupant of the vehicle. FIG. 3 illustrates a visual depiction of the three spatial auditory cues generated within the interior of a vehicle 200 according to the embodiments described herein. The spatial auditory cue may include multiple portions, such as a first portion that begins proximate the driver/occupant's head or in a specific virtual source location within the vehicle. This first portion of the auditory cue is illustrated as portion 202 of FIG. 3 surrounding the driver/occupant's head position 208. This first virtual source location does not need to be proximate the driver/occupant's head position 208, but could be positioned anywhere deemed appropriate to facilitate the second portion of the auditory cue which is dynamic. The second portion of the auditory cue or the "transition portion" has a dynamic virtual source location shown in FIG. 3 as path or trajectory 204, where the virtual source location moves from the first virtual source position along the trajectory 204 to a second virtual source position 206.

The dynamic virtual source location that moves along trajectory 204 represented by the arc provides a dynamic spatial transition, where a virtual source location or source point of the sound progresses from a position close to the driver's head position 208 and moves to a position aligned with the second virtual source position 206, which may be a point between the position of the driver's head 208 and a decision point, point of interest, or waypoint that is the subject of the auditory cue. The second virtual source position aligned with the decision point, point of interest, or waypoint may be a location between the driver, and more specifically the driver's head, and the location to which the driver's attention is to be drawn. Using spatial audio techniques, the location of the sound generated during the dynamic virtual source location moving along the trajectory 204 has a virtual source location that dynamically transitions from the driver to the location of interest. The transition portion of the auditory cue corresponding to the dynamic virtual source location moving along trajectory 204 may provide a wandering voice producing natural language starting an instruction or informative statement at the driver's head and guiding the attention toward the decision point, point of interest, or waypoint. Provided the auditory cue is long enough to provide the first portion of the auditory cue at the first virtual source location at portion 202 and the second portion of the auditory cue along the trajectory 204, a third portion of the auditory cue may follow at the second virtual source location 206.

While the first virtual source location, the trajectory 204, and the second virtual source location 206 are illustrated in a particular configuration in FIG. 3, these locations and trajectories may be varied depending on application and may be configured to virtually any position without deviating from the concepts described herein. For example, the trajectory 204 may be maintained in a frontal field of view/hearing of a driver/occupant. The position may optionally vary based on the type of audio cue to be conveyed. Thus, the relative positions of the audio cue to the driver/occupant are configurable and not limited to the illustrated positions of FIG. 3.

Auditory cues as described herein can include a variety of different formats to convey a variety of different types of information. Auditory cues may include navigational instructions, informative statements to a driver or occupant of a vehicle, a warning, or other information for which directionality is relevant. The directionality refers to the navigational instructions, statements, or warnings having an associated location where a direction indicated by the dynamic movement of the auditory cue provides a directional indication of a location associated with the auditory cue.

Navigational instructions of example embodiments described herein may include one or more components, such as a distance metric, an instruction, and an identifier. A distance metric may include a time or a distance between a location at which the auditory cue is provided to a location associated with the message of the auditory cue. An instruction may include a driver command to follow a particular path or information to inform the driver or occupant with regard to a point-of-interest. An identifier may include a name of a point-of-interest or street name onto which a driver is to turn to follow a path. An example of such an auditory cue including all three components includes: "In 500 meters, turn right on Columbia Parkway". In this example, the distance metric is "in 500 meters", the instruction is "turn right", and the identifier is "on Columbia Parkway". The distance metric may be in the form of time, such as "in 30 seconds, turn right on Columbia Parkway". Further, auditory cues may not require each of these components. For example, an auditory cue may simply state "turn right" or "turn right on Wilson Ave."

Beyond navigational instructions, example embodiments may provide information regarding points of interest. For example, if a vehicle is low on fuel or on battery charge, a navigation system or mobile device may provide information regarding gas stations or charging stations. In such an example, when a gas-powered vehicle is below an eighth of a tank of fuel, as the vehicle approaches a gas station, the auditory cue may state "In 500 feet, gas station on right" or further include relevant information such as "in 500 feet, gas station on right, $2.09/gallon". Such point-of-interest information may be the basis for auditory cues whether the vehicle is traveling along a route with navigational assistance or not. Further, auditory cues may provide warnings regarding accidents or other events. For example, an auditory cue may state: "caution, accident 500 feet ahead on right". Thus, auditory cues may be used for a variety of purposes, and example embodiments described herein provide a mechanism by which auditory cues are provided to a user in such a way as to be easily understood while also providing a directional indication of the information contained in the auditory cue.

Auditory cues are produced in a variety of lengths or durations depending upon the amount of information conveyed and the type of information conveyed. Further, the language of the auditory cue may cause the duration to vary as the same information or instructions may require more or fewer words in different languages. Applicant has found that auditory cues generally average around four seconds, with the salient information regarding a direction (e.g., a direction to be taken in a navigational instruction) found within the first three seconds of duration of an auditory cue after a short introductory portion of the auditory cue. Applicant has further found that using a first auditory cue at a first virtual location, followed by a second portion of the auditory cue having a dynamic virtual source location moving from the first virtual source location along a trajectory and ending at a second virtual source location, where the movement of the virtual source location along the trajectory has a duration of about two seconds, provides a valuable and informative message to a driver or occupant of the vehicle.

The dynamic nature of the auditory cues described herein focus on the duration of the auditory cue, and establish how to present the auditory cue to a user based on the duration. An auditory cue of at least a first predefined time may begin with a first portion of the auditory cue provided at the first virtual source location, such as proximate the driver/occupant's head position 208. That first portion of the auditory cue may have a predefined first portion duration threshold. In an example embodiment, the predefined first portion duration threshold is around one second. The second portion or transition portion of the auditory cue following the first portion may have a dynamic virtual source location moving from the first virtual source location, along a trajectory (e.g., trajectory 204 of FIG. 3), to a second virtual source location. The duration of the transition portion of the auditory cue is a second predefined duration or a predefined transition portion duration threshold, such as around two seconds. If the auditory cue is longer than the combined predefined first portion duration threshold and the predefined transition portion duration threshold, the remaining portion or third portion of the auditory cue may be generated at the second virtual source location.

The above described embodiment relates to auditory cues that are long enough to satisfy the predetermined first portion duration threshold and the predefined transition portion duration threshold, or about three seconds or more. However, not all auditory cues are longer than this summed predetermined duration. In such embodiments, the auditory cue duration is identified in order to determine how to present the auditory cue to a driver or occupant of the vehicle. Embodiments of the present disclosure may prioritize the transition portion of the auditory cue having the dynamic virtual source location as providing value to the occupant or driver with the location aid of the moving, dynamic auditory cue. To that end, when an auditory cue is at least as long as the transition portion duration threshold (e.g., at least two seconds), but less than the sum of the predefined first portion duration threshold and the transition portion duration threshold (e.g., three seconds), the transition portion of the auditory cue may remain equal to the transition portion duration threshold, while the first portion of the auditory cue is reduced to a duration of the auditory cue less the transition portion duration threshold, or somewhere between zero and one second in this example. Thus, the transition portion of the auditory cue is established as the priority when an auditory cue is less than the sum of the predefined first portion duration threshold and the transition portion duration threshold.

Embodiments described herein enable the creation of a recognizable sound movement that has the same duration and speed of movement even when applied to phrases (auditory cues) of different content and duration. FIG. 4 illustrates an example embodiment in which the auditory cue 300 has a duration greater than three seconds (e.g., a predefined threshold or limit), such as of around six seconds. The auditory cue may be generated based on received location based information, where the auditory cue is to convey location based information to a user, such as a driver or occupant of a vehicle 302. The duration of the auditory cue (about six seconds) of the embodiment of FIG. 4 is greater than the sum of the predefined transition portion duration threshold, in this example, two seconds, and the predefined first portion duration threshold, in this example, one second. As such, a first portion 304 of the auditory cue is generated having a duration equal to the predefined first portion duration or duration threshold. A transition portion 306 is generated having a duration equal to the predefined transition portion duration or duration threshold. A third portion 308 is generated having a duration equal to the auditory cue duration less the predefined first portion duration threshold and the predefined transition portion duration threshold, or the remainder of the auditory cue after the first portion and the transition portion.

The first portion 304 of the auditory cue is generated to be heard from a first virtual source location 314, such using three-dimensional spatial audio effects within a vehicle 302. The first virtual source location may be a location proximate the head of the driver or occupant, for example. The transition portion 306 of the auditory cue 300 is generated to be heard starting at the first virtual source location 314 and transitioning dynamically along a trajectory 316 to a second virtual source location 318. The third portion 308 of the auditory cue 300 is generated to be heard from the second virtual source location 318.

FIG. 5 illustrates another example embodiment with a shorter auditory cue 400 of less than three seconds (e.g., a predefined threshold or limit). In this example, the predefined transition portion duration threshold remains two seconds while the first portion duration threshold remains one second. As shown, with less than three seconds of an auditory cue 400, the auditory cue is not long enough to fulfill both the predefined transition portion duration threshold and the first portion duration threshold. As the transition portion of the auditory cue is prioritized, and as the auditory cue is greater than two seconds, a transition portion 406 satisfying the predefined transition portion duration is generated from the final two seconds of the auditory cue. The remaining portion of the auditory cue becomes the first portion 404 of the auditory cue which has a duration of less than one second. The first portion 404 of the auditory cue 400 is generated to be heard at the first virtual source location 314 for the duration of the first portion 404, while the transition portion 406 of the auditory cue is generated to be heard starting at the first virtual source location 314 and transitioning dynamically along a trajectory 316 to a second virtual source location 318 as in the embodiment of FIG. 4. Since the auditory cue 400 is less than three seconds in duration, there is no third portion of the auditory cue.

FIG. 6 illustrates another example embodiment in which an auditory cue 500 is less than two seconds in duration. In this example, the predefined transition portion duration threshold remains two seconds. As the auditory cue 500 is less than two seconds, and as the transition portion is prioritized, the entire auditory cue 500 becomes the transition portion 506 with a duration less than the predefined transition portion duration threshold. The transition portion 506 of the auditory cue is generated to be heard starting at the first virtual source location 314 and transitioning dynamically along a trajectory 316 to a second virtual source location 318 of the vehicle 302.

When an auditory cue is sufficiently long in duration, the first portion, the transition portion, and the third portion are used to alert the driver provide a unique way of grabbing the attention of a user, steering that attention toward a location, and reinforcing the location. FIGS. 7-9 illustrate the spatially positioned auditory cues relative to a user, where a first portion of an auditory cue and/or the start of a transition portion of an auditory cue may be heard as illustrated by the first virtual source location defined by circle 602 in FIG. 7 as an omnidirectional sound with no apparent virtual source location as heard by a user/driver 600. FIG. 8 illustrates the transition portion of the auditory cue as it moves along a trajectory 604 of a voice instruction as the virtual source of the voice instruction begins close to the user 600 and progresses through the trajectory 604 including intermediate point 610 and continues to point 612. This dynamic movement of the virtual source helps the user 600 to better understand a location of the final point 612 as moving sounds may be easier to pinpoint for location relative to stationary sounds as described further below. FIG. 9 illustrates the third portion of the auditory cue and/or the end of the transition portion of the auditory cue occurring at a second virtual source location 606 that is aligned between the user 600 and the location of interest (e.g., decision point, point of interest, waypoint, etc.). The user's 600 line of sight 616 may be directed toward the sound, which the steers the user's attention to the appropriate location. As noted above, not all three portions (the first portion, transition portion, and third portion) may be present. However, even in the event that there is only a transition portion of an auditory cue due to the auditory cue duration being below the predefined transition portion duration threshold, there remains a beginning at the first virtual source location 314 and ending at the second virtual source location 606.

The transition portion of the auditory cue is intended to lead the driver's/occupant's attention toward one direction in space, such as where a driver/occupant needs to go or perform their next maneuver. To leverage a person's ability to locate sounds in space, a basic function of human perception, the transition portion of the auditory cue may be a moving, dynamic sound. The sound may be rendered as a directional virtual source moving on a curved trajectory in the horizontal plane. In this manner, the acoustic sound generating device, whether headphones, headrest speakers, stereo speakers, multi-channel speakers (e.g., 5.1 or 7.1 surround sound speakers) may generate a sound having a virtual source location, where a user may perceive the source of the sound generated by the sound generating device to be coming from the virtual source location. The device may further cause the virtual source location to move in the curved trajectory of the horizontal plane. Sounds in motion may provide stronger localization cues than static sounds and strong mental representations of spatial directions. While a curved trajectory is described with respect to example embodiments provided herein, other trajectories are possible, such as linear trajectories or poly-line trajectories, for example.

According to some embodiments, the map data in map database 110 of map data service provider 108 may be used to define the timing of the auditory cues which need to correspond to a location of a maneuver, point of interest, or waypoint taking into account an appropriate distance at which to start the notification, calculate a future vehicle position, and give the user/driver enough time to perform the maneuver.

While embodiments may be implemented in a vehicle as a navigational aid or route guidance mechanism, embodiments may optionally be implemented for a pedestrian or operator of other mode of transportation, such as a bicycle. In such a manner, a pedestrian or cyclist may use headphones or earbuds, and may use example embodiments described herein in the same manner as an automotive implementation.

FIGS. 10 and 11 are a flowcharts illustrative of methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 10 illustrates a method for providing an auditory cue regarding location based information to a user such as an occupant or driver of a vehicle. An auditory cue is received as shown at 700. The auditory cue may be generated by a mobile device 104 based on location information or generated by a map data service provider 108 and provided to the mobile device 104 for presentation to a user. At 702, a determination is made as to whether the auditory cue duration is greater than a predetermined transition portion duration threshold (TPDT). If the duration of the auditory cue is less than the predetermined transition portion duration threshold, the transition portion is generated at 704 including the entire auditory cue as the auditory cue is not sufficiently long to have a first portion or a third portion. The auditory cue is then output using spatial audio effects at 706 If the auditory cue is determined to be greater than a predetermined transition portion duration threshold at 702, a determination is then made at 708 as to whether the auditory cue has a greater duration than the predetermined transition portion duration threshold plus the predetermined first portion duration threshold (TPDT+FPDT). If the auditory cue is shorter than this summed duration, the transition portion is generated at 710 having a duration equal to that of the predetermined transition portion duration threshold. The first portion of the auditory cue is generated at 712 having a duration equal to the auditory cue duration less the predetermined transition period duration threshold. The auditory cue is then output using spatial audio effects at 706.

If the auditory cue has a duration greater than the sum of the predetermined transition portion duration threshold and the predetermined first portion duration threshold at 708, a transition portion having a duration equal to that of the predetermined transition portion duration threshold is generated at 714. A first portion of the auditory cue is generated at 716 having a duration equal to the predetermined first portion duration threshold. A third portion of the auditory cue is generated at 718 having a duration equal to the auditory cue duration less the predetermined first portion duration threshold and the predetermined transition portion duration threshold. The auditory cue is then output at 706 using spatial audio effects.

While the example embodiments described herein use a predetermined transition portion duration threshold of two seconds and a predetermined first portion duration threshold of one second, these thresholds may be configurable and may be altered as deemed necessary to convey different types of information. For example, point of interest information may have higher thresholds as it may include more information that is conveyed to a user. Optionally, the thresholds may be established based on the type of information conveyed at the beginning, middle, and end of an auditory cue. Further, these thresholds may change depending upon the language used for the auditory cue as some languages may result in different average durations for an auditory cue.

According to the embodiments described above, there exist two thresholds: a predetermined transition portion duration threshold; and a first portion duration threshold. While these thresholds may be configurable, the thresholds may also not be absolute. For example, the thresholds may have tolerance windows that are fractions of a second, whereby if a transition portion duration threshold is 2.00 seconds and a duration of an audio cue is 2.01 seconds, the entirety of the audio cue may still be considered as the transition portion. A tolerance may be, for example, a tenth of a second where an audio cue extending for a tenth of a second beyond a threshold may be treated as it would be if it were equal to or less than the threshold. The tolerance around a threshold may serve to preclude audio cue portions of very finite duration which may potentially confuse an occupant or driver of the vehicle.

FIG. 11 illustrates another example of a method for providing an auditory cue regarding location based information to a user such as an occupant or driver of a vehicle or a device of the user. As shown, an indication of location based information is received at 802. This may be received at the mobile device 104 or the map data service provider 108, for example. An auditory cue may then be generated at 804 associated with the location based information. This auditory cue may be generated at the mobile device 104 or at the map data service provider, for example. A duration of the auditory cue is established at 806. The duration may be established based on a natural language generation application that produces the speech from the information to be conveyed to a driver or occupant of the vehicle. The natural language generation of an audio cue may provide a duration indicative of how long it will take to speak the audio cue. As some phrases are spoken faster than others, a mere indication of the length of a phrase or instruction to be conveyed may not be sufficient to accurately identify a duration of an audio cue. At 808, a transition portion of the auditory cue is generated having a dynamic virtual source location moving from a first virtual source location along a trajectory and ending at a second virtual source location.

In an example embodiment, an apparatus for performing the methods of FIGS. 10 and 11 above may comprise a processor (e.g., the processor 24) configured to perform some or each of the operations (700-718 and/or 802-808) described above. The processor may, for example, be configured to perform the operations (700-718 and/or 802-808) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 700-718 and/or 802-808 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the That which is claimed:

1. An apparatus comprising at least one processor and at least one non-transitory memory including computer program code instructions, the computer program code instructions configured to, when executed, cause the apparatus to at least:
receive an indication of location based information for a user;
provide for generation of an auditory cue associated with the location based information;
determine a duration of the auditory cue; and
provide for generation of a transition portion of the auditory cue having a dynamic virtual source location moving from a first virtual source location along a trajectory and ending at a second virtual source location, wherein the transition portion of the auditory cue has a transition portion duration determined by the duration of the auditory cue, and wherein the transition portion duration of the auditory cue does not exceed a predefined transition portion duration threshold.

2. The apparatus of claim 1, wherein the apparatus is further caused to:
generate a first portion of the auditory cue in response to the duration of the auditory cue exceeding the predefined transition portion duration threshold, wherein the first portion of the auditory cue has a stationary virtual source location at the first virtual source location, wherein the first portion of the auditory cue does not exceed a predefined first portion duration threshold.

3. The apparatus of claim 2, wherein the apparatus is further caused to:
generate a third portion of the auditory cue in response to the duration of the auditory cue exceeding a total of the predefined transition portion duration threshold and the predefined first portion duration threshold, wherein the third portion of the auditory cue has a stationary virtual source location at the second virtual source location.

4. The apparatus of claim 3, wherein the third portion of the auditory cue has a duration that is equal to the duration of the auditory cue less the predefined first portion duration threshold and the predefined transition portion duration threshold.

5. The apparatus of claim 1, wherein causing the apparatus to provide for generation of the transition portion of the auditory cue having a dynamic virtual source location moving from the first virtual source location along the trajectory and ending at the second virtual source location comprises causing the apparatus to provide for generation of the transition portion of the auditory cue having the dynamic virtual source location moving from the first virtual source location along the trajectory and ending at the second virtual source location using three-dimensional spatial audio effects.

6. The apparatus of claim 1, wherein the second virtual source location is a location positioned between the user and a location identified in the location based information.

7. The apparatus of claim 1, wherein the first virtual source location is proximate a head of the user and wherein the trajectory is a curved trajectory from the first virtual source location to the second virtual source location.

8. The apparatus of claim 1, wherein the transition portion of the auditory cue comprises a natural language instruction indicating an action to be taken.

9. A computer program product comprising at least one non-transitory computer-readable storage medium having computer-executable program code instructions stored therein, the computer-executable program code instructions comprising program code instructions to:
receive an indication of location based information for a user;
provide for generation of an auditory cue associated with the location based information;
determine a duration of the auditory cue;
in response to the duration of the auditory cue being less than a predefined transition portion duration threshold:
generate a transition portion comprising the auditory cue having a dynamic virtual source location moving from a first virtual source location along a trajectory and ending at a second virtual source location;
in response to the duration of the auditory cue being greater than a predefined transition portion duration threshold:
generate a first portion of the auditory cue having a stationary virtual source location at the first virtual source location; and
generate a transition portion of the auditory cue having a duration equal to the predefined transition portion duration and having a dynamic virtual source location moving from a first virtual source location along a trajectory and ending at a second virtual source location.

10. The computer program product of claim 9, further comprising program code instructions to:
in response to the duration of the auditory cue being greater than a total of the predefined transition portion duration threshold and a first portion duration threshold:
generate a third portion of the auditory cue having a stationary virtual source location at the second virtual source location, wherein the first portion of the auditory cue precedes the transition portion, and wherein the third portion of the auditory cue follows the transition portion.

11. The computer program product of claim 9, wherein generation of the first portion of the auditory cue at the first virtual source location and generation of the transition portion of the auditory cue having the dynamic virtual source location moving from the first virtual source location along the trajectory and ending at the second virtual source location are performed using three-dimensional spatial audio effects.

12. The computer program product of claim 9, wherein the second virtual source location is a location positioned between the user and a location identified in the location based information.

13. The computer program product of claim 9, wherein the transition portion of the auditory cue comprises an instruction including an action to be taken, and wherein the first portion of the auditory cue comprises an indication of a distance to reach a location where the action is to be taken.

14. The computer program product of claim 13, wherein the auditory cue comprises a natural language sentence conveying the location based information to the user.

15. The computer program product of claim 9, wherein the first virtual source location is proximate a head of the user and wherein the trajectory is a curved trajectory from the first virtual source location to the second virtual source location.

16. A method comprising:
providing for generation of an auditory cue;
determining a duration of the auditory cue; and
providing for generation of a transition portion of the auditory cue having a dynamic virtual source location moving, relative to a user, from a first virtual source location along a trajectory and ending at a second virtual source location, wherein the transition portion of the auditory cue has a transition portion duration determined by the duration of the auditory cue and as a function of a predefined transition portion duration threshold.

17. The method of claim 16, further comprising:
generating a first portion of the auditory cue in response to the duration of the auditory cue exceeding the predefined transition portion duration threshold, wherein the first portion of the auditory cue has a stationary virtual source location at the first virtual source location, wherein the first portion of the auditory cue does not exceed a predefined first portion duration threshold or has a duration substantially equal to the auditory cue duration less the predefined transition portion duration threshold.

18. The method of claim 17, further comprising:
generating a third portion of the auditory cue in response to the duration of the auditory cue exceeding a total of the predefined transition portion duration threshold and the predefined first portion duration threshold, wherein the third portion of the auditory cue has a stationary virtual source location at the second virtual source location.

19. The method of claim 18, wherein the third portion of the auditory cue has a duration that is equal to the duration of the auditory cue less the predefined first portion duration threshold and the predefined transition portion duration threshold.

20. The method of claim 16, wherein the auditory cue comprises location based information for the user, wherein the first virtual source location is proximate a head of the user, wherein the trajectory is a curved trajectory from the first virtual source location to the second virtual source location, and wherein the second virtual source location is a location positioned between the user and a location identified in the location based information.

* * * * *